Oct. 11, 1938.                H. H. LOGAN                 2,133,104
                              HOIST RECORDER
                            Filed May 25, 1936              4 Sheets-Sheet 3
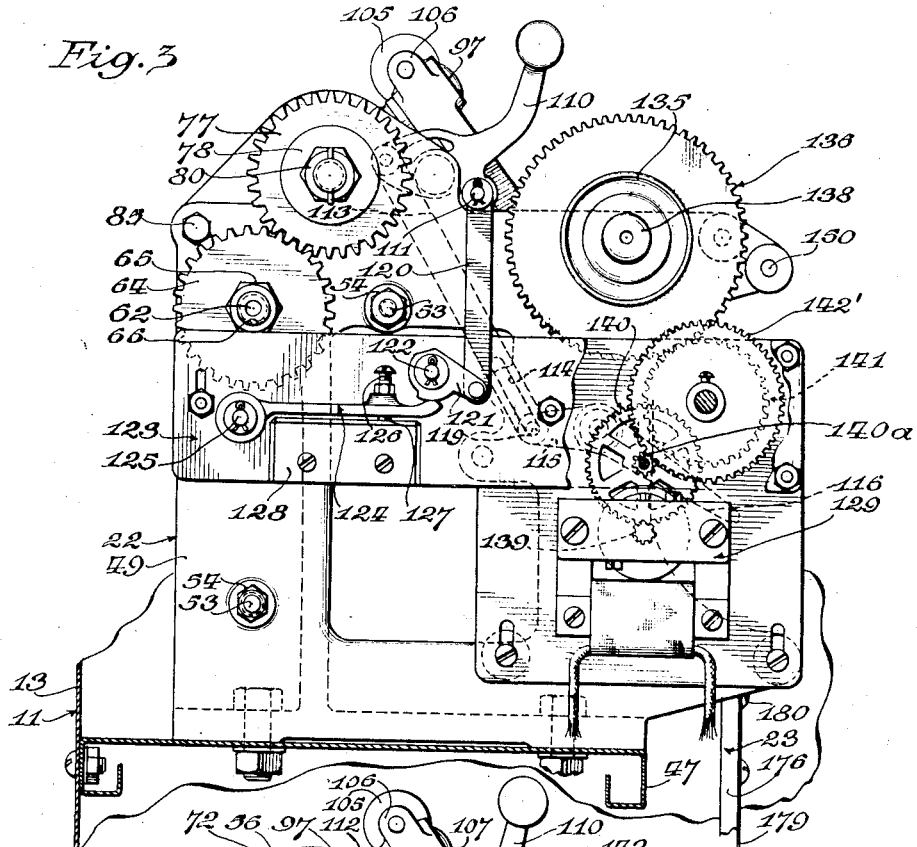
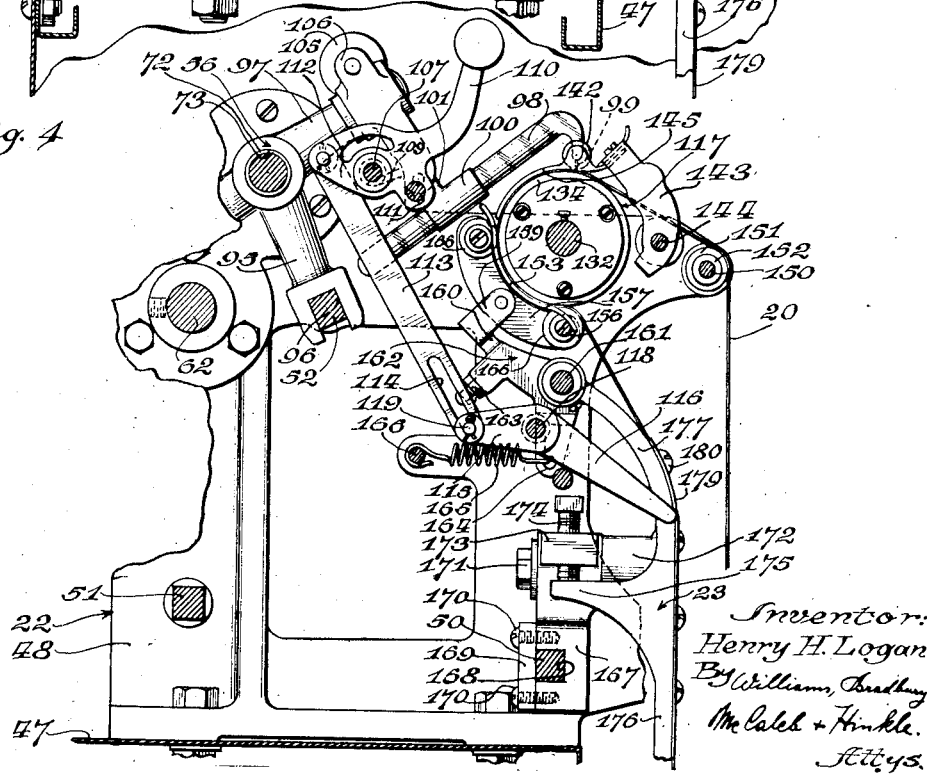
Inventor:
Henry H. Logan
By Williams, Bradbury,
McCaleb & Hinkle.
Attys.

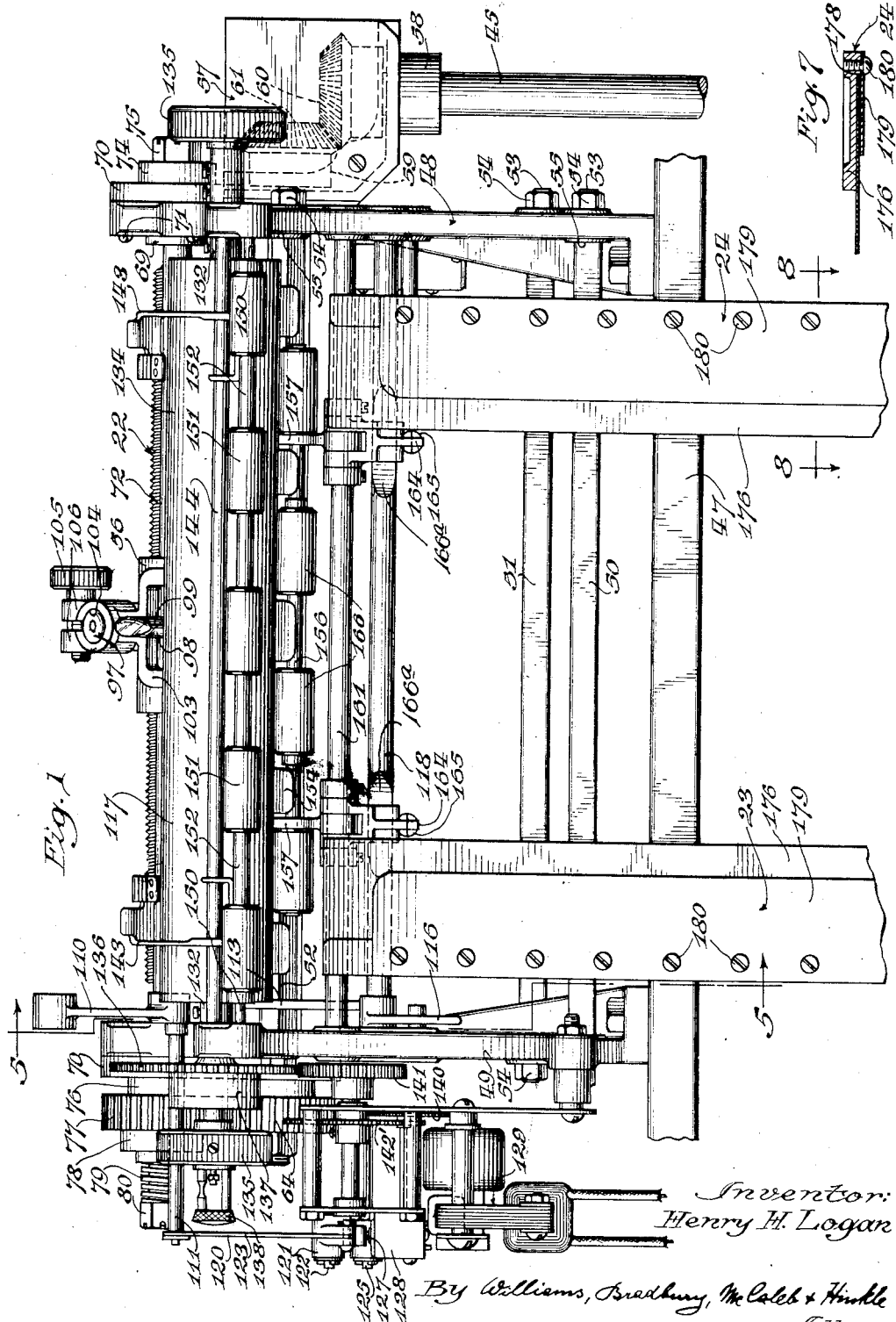

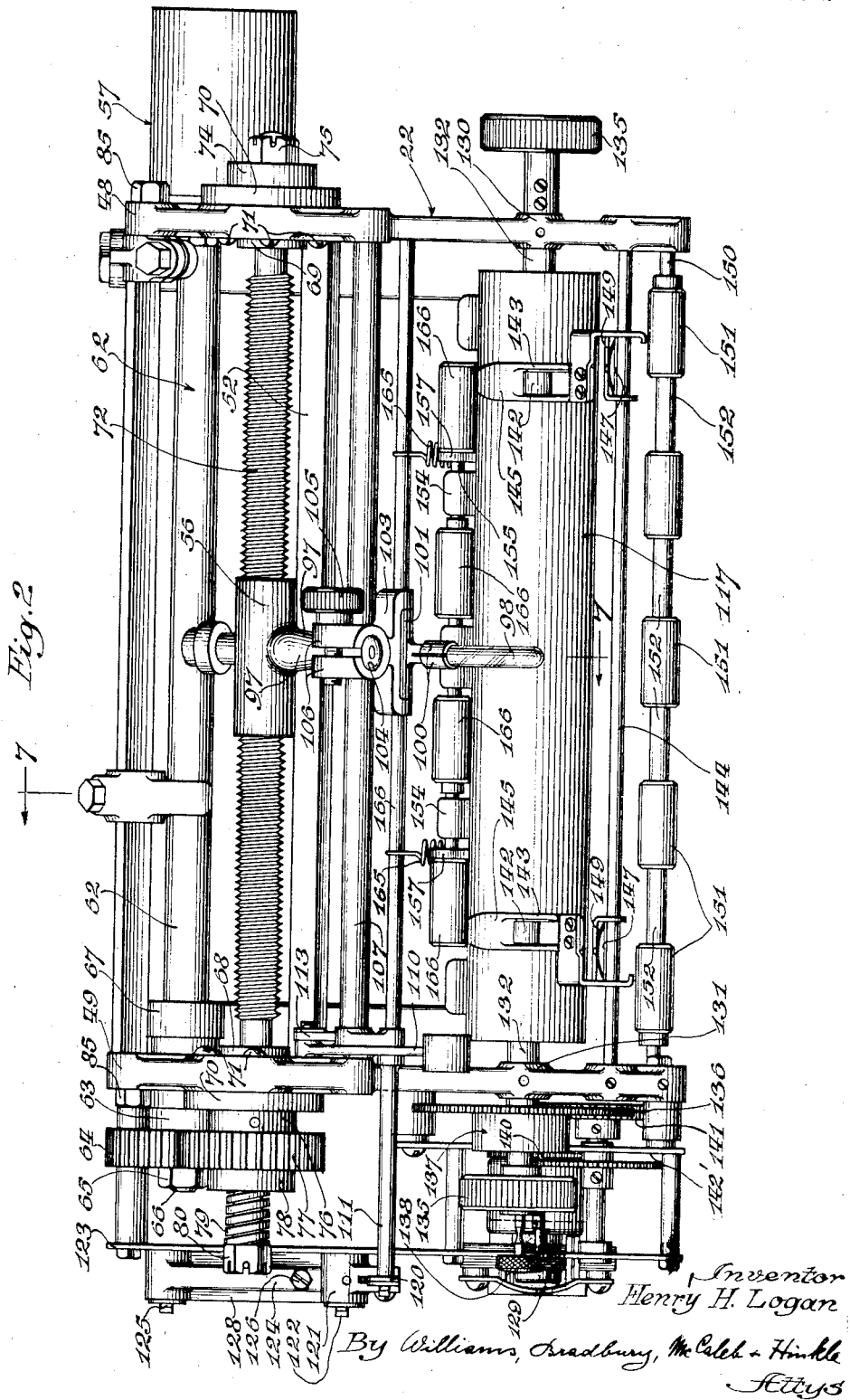

Oct. 11, 1938.  H. H. LOGAN  2,133,104
HOIST RECORDER
Filed May 25, 1936  4 Sheets—Sheet 4
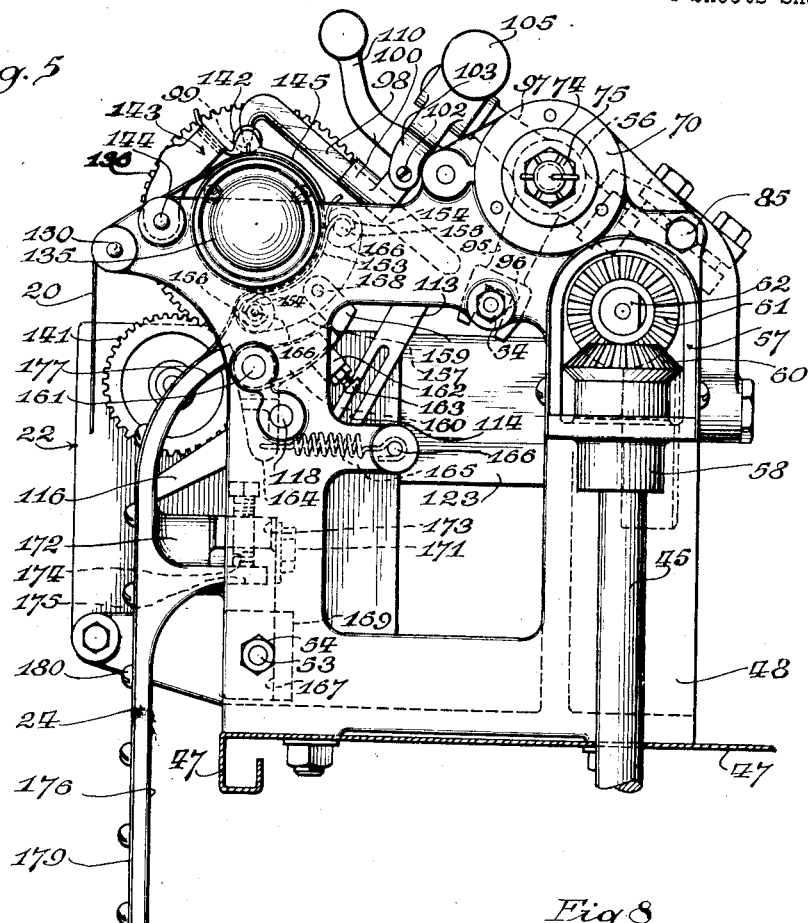
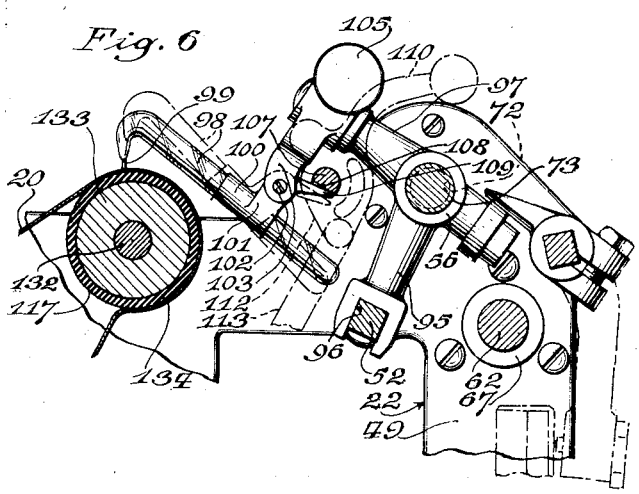
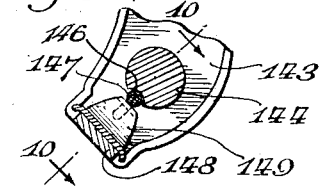
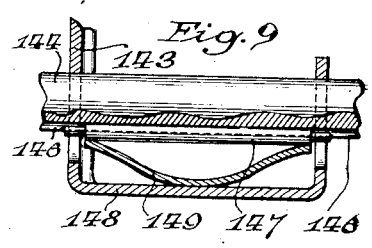
Inventor:
Henry H. Logan
By Williams, Bradbury, McCaleb & Hinkle
Attys.

Patented Oct. 11, 1938

2,133,104

UNITED STATES PATENT OFFICE 2,133,104

HOIST RECORDER

Henry H. Logan, Chicago, Ill.

Application May 25, 1936, Serial No. 81,667

3 Claims. (Cl. 234—1.5)

The present invention relates to mine hoist recorders. It is particularly concerned with the provision of an improved hoist recorder which is adapted to perform the following functions:

(A) To show whether the hoist has been operating steadily or not, and when busy and slack periods occur.

(B) To show the points between which the cage or skip operated.

(C) To show the hoisting speeds.

(D) To enable the mine foreman or superintendent to work out his schedule to the best advantage, based on proven performance as recorded on former charts.

(E) To assist in locating causes of delay or failure to operate up to schedule.

(F) To insure activity in the engine room and about the shaft, workmen realizing that a graphic record will show all cage movements and delays.

(G) To eliminate from blame for delays those who are not responsible for causing the delays.

(H) To assist in determining the cause of accidents that may occur in and about the shaft or hoisting equipment.

(I) To show the time taken to inspect the shaft, guides and ropes.

(J) To indicate the amount of rope travel, which combined with tonnage hoisted will furnish a basis for estimating the service obtained from the ropes, and if necessary making adjustments with the rope manufacturer.

(K) In general, to present in simple graphic form a complete picture of all hoist movements and nonoperating periods, and thus promote efficiency and eliminate guesswork.

One of the objects of the invention is the provision of an improved hoist recorder, in which the timing motor is automatically shut off and chart movement stopped when the pen is not in contact with the paper.

Another object is the provision of an improved hoist recorder having a safety clutch drive for actuating the pen traveler nut so that there is no danger of the mechanism locking or becoming wrecked by improper connection of the recorder to the hoist.

Another object is the provision of an improved automatic cut-off which prevents the actuation of the recorder unless the paper has been gripped by the rollers which insure its movement in synchronism with the timing mechanism.

Another object is the provision of an improved hoist controller having a conveniently removable pen unit and having a friction clutch on the paper roller, which permits adjustment of the paper to the exact time instead of to the gear tooth, as in the devices of the prior art.

Another object is the provision of an improved recorder structure which is adapted to utilize a large scale chart showing accurately all hoist movements and delays, and by means of which there is complete visibility of the record at all times.

Another object is the provision of an improved hoist recorder which is more sturdy, efficient, accessible and adaptable to all conditions than the devices of the prior art.

Referring to the four sheets of drawings,

Fig. 1 is a front elevation of the recorder mechanism, the paper guides having fragments broken off to condense the view;

Fig. 2 is a top plan view of the recorder mechanism;

Fig. 3 is a left end view showing the mechanism with a fragment of the housing;

Fig. 4 is a fragmentary sectional view taken on the plane of the line 5—5 of Fig. 1, showing details of construction of the mechanism, particularly the pen controlling linkage;

Fig. 5 is a right end elevational view taken with reference to the mechanism of Fig. 1, showing a fragment of the housing;

Fig. 6 is a sectional view, taken on the plane of the line 7—7 of Fig. 2;

Fig. 7 is a fragmentary sectional view, taken through one of the paper guides on the plane of the line 8—8 of Fig. 1, looking in the direction of the arrows;

Fig. 8 is a fragmentary view of the spring arrangement for urging the rollers 142 against the paper roller 117.

Fig. 9 is a sectional view taken on the plane of lines 10—10 of Fig. 8.

Referring to Figs. 1 to 6, which show the details of the recorder mechanism. This mechanism is supported upon a metal shelf 47 fixedly mounted in the upper part of the housing 11 a portion of which is shown in Fig. 4, and the base of the mechanism may be bolted to the shelf, as shown in Figs. 1 and 5.

The whole mechanism is mounted upon a frame which may comprise a pair of cast metal end plates 48, 49. Each end plate has a lower attaching flange or foot and a plurality of bearing apertures or apertures for attachment of various parts, as described later.

The two plates 48, 49 are secured together by a plurality of cross rods 50, 51 (Fig. 1) and 52 (Fig. 4) of steel or other suitable material. These cross rods are rods of rectangular section, having reduced threaded ends 53 for receiving the nuts 54 which clamp the plate against the shoulder 55 on the rod. Various other transversely extending rods and guides also serve to stiffen the structure as well as perform other functions. The rods 50 and 51 are solely for the purpose of supporting the plates, while the rod 52 also serves as a guide and for preventing rotation of a follower 56.

The right end of the mechanism (Fig. 1) is provided with a cast metal bearing member 57 having a pair of bearings 58, 59 at right angles to each other. The bearing 58 rotatably supports the upper end of the vertical drive shaft 45, which is secured to a bevel gear 60.

Bevel gear 60 engages a bevel gear 61, which is secured to a transverse drive shaft 62 (Fig. 3). The transverse drive shaft 62 is also rotatably mounted in a bearing 63 carried by the other supporting plate 49, and the shaft 62 carries a spur gear 64 which is fixedly mounted on the shaft 62 by means of a key not shown, and a nut 65 on threaded portion 66.

Suitable thrust collars 67 engage the ends of the bearings and hold the shaft against axial movement. The supporting plates 48, 49 also support shaft bearings 68, 69, which have their attaching flanges 70 secured to the supporting plates by screw bolts 71. These two bearings rotatably support a screw shaft 72 having a right hand screw covering substantially all of the area between the two plates 48, 49 and adapted to engage a complementary internal thread located in the bore 73 of follower 56.

The right end (Fig. 2) of screw shaft 72 has a thrust collar 74 and a nut 75 on a reduced threaded portion, secured by a cotter to prevent its loosening. The left end of the screw shaft 72 has a thrust collar 76 fixedly secured thereto by a pin, and a spur gear 77 is rotatably mounted on the screw shaft 72 and engaged by another thrust collar 78.

A relatively heavy coil spring 79 is compressed between the thrust collar 78 and a nut 80, which is secured by threads and cotter on the threaded left end of screw shaft 72. Thrust collars 76, 78 and spur gear 77 constitute a releasable clutch drive between the screw shaft 72 and the drive shaft 62.

Thus, when the traveler 56 happens to be at the wrong end of its travel and the hoist is connected to the hoist recorder, the traveler 56 will be actuated until it engages one of the bearings 68 or 69, after which it can move no farther. Were it not for the clutch 76, 77, 78, the mechanism might be broken, but the clutch permits the drive shafts to continue to rotate without damage to the traveler or screw shaft. This defective connection would immediately be observed, since the traveler would not move any more, and it would be corrected, or the traveler might remain at that end until the hoist had made a complete trip, and upon the return movement of the hoist the traveler would be automatically picked up and would operate in synchronism with the hoist. The clutch thus permits the automatic synchronization of the traveler with the hoist.

The hoist recorder is located in the engine room and is driven by gears or a roller chain and sprockets in ratio with the hoisting drum so that each and every movement of the drum causes a corresponding movement of the drive to the recorder. Specifically, the connection to the drum is suitably made at an end of a shaft, not shown, extending transversely through the lower portion of the housing 11 and in drive connection with shaft 45 (Fig. 1).

The traveler 56 also has a downwardly extending lug 95 with a substantially rectangular groove 96 slidably engaging the cross rod 52. This prevents any rotation of the slider and causes it to progress along the screw 72 as the screw shaft rotates.

The traveler 56 also carries an upwardly and forwardly extending lug 97 (Fig. 4) for the purpose of supporting a pen. The pen may comprise any suitable unit or fountain pen, having its reservoir 98 for receiving the ink, and having a suitable pen point 99. The glass reservoir 98 is clamped by a pair of cylindrical flanges 100 carried by a metal fitting 101. The metal fitting 101 is rotatably mounted on the pin 102 carried by a stirrup 103. The stirrup 103 has a transverse bore 104 for receiving the end of the lug 97. It is clamped on the lug 97 by the threaded member 105, which draws the two legs 106 together.

Thus the pen and its support constitute a unit which may be removed from the follower for filling, repair or replacement.

The side plates 48 and 49 also rotatably support a cam shaft (Fig. 6) 107, having a flattened side 108 which is adapted to engage a flat tail or extension 109 carried by the pivoted pen supporting fixture 101.

The cam shaft 107 is provided with a counterbalance lever 110, which is fixedly secured to the cam shaft and which carries a laterally projecting rod 111. The lever 110 also has a downward extension 112 (Fig. 5) which is pivotally connected to a connecting link 113.

The link 113 has a slot 114 for a pivotal and sliding connection with an arm 115 of a lever 116. The lever 116 controls the release of the paper from the roll 117, as will be further described, and this lever is pivoted at 118 by being mounted on the shaft 118, which is also a cam shaft.

Due to the slot 114, the counter-balance lever 110, which actuates the cam shaft 107, may be moved independently of the lever 116, the pin 119 sliding in the slot 114. This means that the lever 110 may be used to lift the pen at any time. The counter-balance at the end of the lever tends to keep it in the position to which it is thrown.

The laterally extending rod 111 is pivotally connected to the end of a link 120 (Fig. 3). Link 120 extends downwardly and is pivotally connected to a cam 121.

The cam 121 is mounted for rotation about the axis of a pin 122 which is fixedly mounted upon an auxiliary supporting plate 123. The supporting plate 123 carries a switch actuating lever 124 which is pivotally mounted on the fixed pin 125. An adjustable screw 126 is carried by the switch lever 124 so as to enable the adjustment of this lever with respect to the push button 127 of another microswitch 128.

The microswitch 128 is adapted to control the clock mechanism. The clock mechanism, indicated in its entirety by the numeral 129, may comprise a synchronous electric clock adapted to be actuated by alternating current. The electric circuits through the clock are controlled by the microswitch 128, and the mechanism including the link 120, cam 121, and lever 124 operates to open the clock circuit whenever the pen is lifted, and to close the clock circuit whenever the pen rests upon the paper.

The side plates 48 and 49 are also provided with bearings 130, 131 formed in them for supporting the trunnions 132, which are attached to a platen or rubber paper roller 117. The structure of this roller is shown in Fig. 6, and it comprises a wooden cylinder 133, with a rubber covering 134. The roller trunnions 132 are provided at each end with a hand knob 135 to be used in adjusting the roller. At the left end of the paper roller the trunnion 132 carries a spur gear 136, which carries a clutch housing 137.

The spur gear and clutch housing are mounted for free rotation with respect to the paper roller trunnion 132. A clutch is provided in the clutch housing 137 and is adapted to selectively connect this housing to the trunnion 132. The clutch may be disconnected by pulling out on the knob 138, and it may be connected with the housing 137 by pushing inwardly upon the knob 138.

This clutch enables the operator to adjust the paper to the exact time when the machine is put in operation so that the pen may record accurately the operations of the hoist. Without such a clutch, one could only adjust the roller to the nearest gear tooth.

The roller 117 is driven in synchronism with the clock mechanism 129 by means of a system of gearing comprising the pinion 139, spur gear 140, pinion 140A, spur gears 142' and 141, the latter meshing with the spur gear 136.

The chart 20 not shown in detail, upon which the record is made is provided with lines somewhat in the manner of letter paper, and in one embodiment of the invention the space between each two lines represents five minutes. The chart is provided with indicia for each space between the lines at intervals of five minutes, such as five, ten, fifteen, twenty, etc. minutes. The line of every twelfth space is provided with indicia indicating the hour, beginning at eight o'clock in the morning, and running up to eight o'clock at night.

The width of the chart, which corresponds to the length of the paper roller 117 (Fig. 2) or the distance between the guides 23 and 24 (Fig. 1), corresponds to the trip which the cage or skip takes. Therefore, the chart has a continuous line drawn on it by the pen as the paper progresses on the roller 117. This line is preferably drawn with colored ink, if the chart is printed in black ink, for the purpose of contrast, and the vertical portions of the lines at the right indicate the time spent with the hoist out of operation and the cage at that end of the trip. The vertical lines at the left end of the chart or any other point indicate the time in minutes, by their length, spent at those points, respectively, with the hoist out of operation and the cage still.

The horizontal and slightly sloping lines of the chart indicate the progress of the skip or cage upward or downward, as the case may be. For example, if the line extending downward toward the left indicates the skip going downward, then the line extending downward toward the right indicates the progress of the skip upward.

Thus, a multiplicity of zig-zag lines are drawn on the chart and continuously connect with each other by vertical portions at each end, and by their relation to the indicia of depth or elevation at the top of the chart they indicate the trips taken by the skip or cage, the times and places where stops were made, and the duration of those stops.

The paper roller 117 is preferably provided with means for holding the paper in close engagement with the roller so as to keep the paper moving in synchronism with the clock.

This means may consist of a pair of upper rubber rollers 142 (Fig. 5), which are carried by sheet metal carriers 143. The sheet metal carriers are rotatably mounted upon the cross rod 144 and provided with suitable spring means for pressing the rollers 142 against the paper roller 117. The arms 143 have curved guide flanges 145, which extend downwardly about the paper roller 117 and engage the leading edge of the paper to assure it being guided under the rollers 142 as it comes up about the paper roller 117.

The roller supports 143 may be lifted by hand, and when lifted the springs which urge the rollers 142 into engagement with the paper roller 117 are released.

The shaft 144 (Fig. 8) has a slot 146 for receiving a roller 147. The arm 143 has a substantially U-shaped extension 148 with apertures at each end for the roller 147. A spring 149 engages the roller and tends to urge it into the groove or slot 146 when the arm 143 is in the position of Fig. 5.

The frame members 48 and 49 also preferably support a shaft 150, which carries a multiplicity of rotatable rubber rollers 151 for supporting the paper as it comes from the large roller 117.

These rubber rollers 151 are spaced from each other by tubular metal members 152. The large roller 117 is also preferably provided with means on its lower and rear side for guiding the paper, comprising a curved sheet metal guide member 153, which has a plurality of outwardly curled end portions 154 engaging about the shafts 155, 156 (Fig. 5).

The shafts 155, 156 are carried by a pair of arcuate metal members 157, each of which is pivotally mounted by means of a pin 158 on an arm 159. The arm 159 extends radially away from the large roller 117, and then circumferentially at 160, and is pivotally mounted on a shaft 161.

The shaft 161 extends between the supporting side plates 48, 49, and it pivotally supports a pair of stirrups, one for each arm 160. A stirrup is shown at 162, and it comprises a substantially U-shaped member having both of its legs pivoted on the shaft 161 and a threaded screw bolt 163 located at its yoke for engaging the arm 160. These stirrups are better shown at 162 in Fig. 4.

Each stirrup has a depending arm 164 having an aperture for receiving the hooked end of the spring 165, the other end of which is hooked about a pin 166 carried by the frame. Spring 165 constantly urges stirrups 162 into engagement with the arms 160. Thus the spring 165 tends to press the stirrup against the arm 160, and the arm 160 holds the curved sheet metal guide 153 against the large roller 117. The shaft 118 has a flattened portion 166a, Fig. 2, acting as a cam and engaging the depending arm 164 so that when the lever 116 is lifted, the sheet metal guide 153 and rollers carried by it are withdrawn from the large roller 117.

The shafts 155, 156 carry a multiplicity of rubber rollers 166 for engaging the paper. As previously stated, the lifting of the lever 116 is adapted to effect a lifting of the pen 98 from the paper. It is now seen that when the lever 116 is actuated to release the paper from the roller 117, the pen is simultaneously lifted so that no ink is discharged on the rubber roller 117.

The paper extends upwardly between the small rubber rollers and the large rubber roller 117, being guided by the sheet metal members 153 and 145, until it emerges above the rollers 151.

It is then permitted to hang downward over the rollers 151.

In order that the paper may be accurately located with respect to the pen, the machine is preferably provided with the paper guides (Figs. 1 and 4) 23 and 24. These guides are shown in section at Fig. 7. They are secured to the cross bar 50 by means of a block 167, having a slot 168 fitting the square cross rod 50. A plate 169, clamped on the block by means of screw bolts 170, secures the block 167 to the cross rod.

Block 167 is provided with a bore for receiving a screw bolt 171. Screw bolt 171 is fixedly secured in the body 172 of the guide, and the block is provided with a substantially T-shaped top, having two arms 173 extending in opposite directions, and provided with adjusting screws 174 threaded into the arms.

The guide body 172 has a pair of rearwardly projecting lugs 175, one located under each screw 174. Thus the guides 23 and 24 may be adjusted to assume a vertical position by bringing the screws 174 to bear upon the lugs 175, and the guides may be secured in any predetermined position.

The guides 23 and 24 comprise elongated cast metal strips 176 having an outer nickled surface over which the paper slides. They have an inwardly curved end portion 177 at the top, holding the paper at the proper position underneath the large roller 117. They have a longitudinally extending rib 178 along one edge for supporting a sheet metal confining strip 179, which is secured to the guide by screw bolts 180. The paper slides in between the guide body 176 and the sheet metal strip 179, and the two guides are accurately adjusted parallel to each other in such manner as to guide the paper along a path which is accurately at right angles to the axis of the large roller 117.

Furthermore, these guides hold the paper at a predetermined position with respect to the length of the roller so that when the guides are once adjusted the marks made upon the paper accurately indicate the position of the cage which is lifted by the hoist.

The operation of the hoist recorder is as follows: A new chart is inserted every day, and it is provided with the indicia showing the hours of the day and the minutes of each hour at the left and right sides of the longest sides of the chart. It may also be provided with indicia across the top indicating the feet of depth of the mine to which the cage goes, and also indicating the various dumping positions and landings.

The pen is filled with colored ink. The paper is so calibrated that when the traveler and pen are at a predetermined point which corresponds with indicia on the chart, the hoist cage is at that point with respect to the mine shaft. Thus, when the pen is at the point indicated "dump", the cage is at the ore dump, or when the pen is below the indicia 1500 the cage is at a depth of 1500 feet in the shaft.

The paper is started by adjusting the paper on the roller so that it corresponds to the time of day when the paper is started, and the pen is lowered on the paper by means of the lever 116, which also connects the clock mechanism in circuit.

Thereafter, when the hoist moves the cage up and down the shaft, the traveler 56 also moves back and forth on the screw shaft 72 and keeps the pen moving across the chart, drawing a line which corresponds to the travel of the cage or skip. The chart is moved over the platen 117 at a rate which corresponds to the scale on the chart, and the lapse of time is shown by the downward slope of the skip travel lines and by the vertical length of the lines at the left and right hand parts of the chart which indicate when the hoist is still.

As much of the chart as has been inscribed with curves may be inspected at any time through the large glass door of the housing, or if more of the chart has been run off than the length of the door, the door may be opened and the lower end of the chart may be spread out on the floor, or held in the hand.

The chart makes a faithful record of the operation of the hoist, the time involved in its travel, the time involved at any stop at a landing, and the use of such a recorder greatly increases the efficiency of any hoisting equipment.

A record is kept of inspections, the amount of rope travel, and the chart shows the number of trips, when they were made, points between which they were made, the hoist speeds, whether the hoist has been operating steadily or not, and when the busy and slack periods occur. It aids in fixing the blame for delays and assists in locating causes of delay or failure to operate on schedule. It aids in preventing accidents and assists in determining the cause of any accidents and fixing the blame for various accidents which might occur.

The interlock between the clock switch and the pen lifting device assures the lifting of the pen whenever the clock has been turned off. The interlock between the paper holding rollers and the pen assures the lifting of the pen when the paper is being adjusted on the large roller.

The clutch on the drive for the screw shaft assures the operation of the traveler in the proper direction in synchronism with the hoist, and it also prevents damage to the traveler and the screw shaft.

The present device may be used upon a single drum hoist or upon double drum hoists, where both drums are operated in fixed relation to each other. A double drum hoist, operating with either drum independently at times or in varying relations to the other drum, should have two recorders in order to produce a complete record for each drum.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent is:

1. In a mine hoist recorder, the combination of a supporting frame, a rotatably mounted platen in said frame, a chart on said platen, a hoist driven screw shaft rotatably mounted in the frame, a marking device having a pivoted marking point on said screw shaft adapted to move longitudinally thereof when the shaft is rotated to mark on the chart, a lug on said pivoted marking point, movable chart holding means adapted to be moved into engagement with the chart on the platen, cam means rotatably mounted in said frame, cam operating means adapted to rotate said cam means against said lug on said marking point to pivot the marking point upward from the chart and releasing means connected to said cam operating means adapted to move said chart holding means for disengagement of the same with the chart simultaneously with the upward pivotal movement of the marking point.

2. In a mine hoist recorder, the combination of a supporting frame, a rotatably mounted platen in said frame, a chart on said platen, a screw shaft rotatably mounted in the frame, means driven by the movement of the mine hoist adapted to rotate the screw shaft, a marking device having a pivoted marking point on said shaft adapted to be moved longitudinally thereof when said shaft is rotated to mark on said chart, a lug on said pivoted marking point, an electric clock mechanism adapted to rotate the platen in synchronism with said hoist driven screw shaft and transmit movement to the chart carried thereby, an electric switch in said clock circuit, cam means rotatably mounted in said frame, cam operating means adapted to rotate said cam means into engagement with said lug on said marking point to pivot the marking point upward from the chart and clock switch operating means connected to said cam operating means adapted to open said clock switch by the upward pivotal movement of the marking point from the chart whereby rotation of the platen and movement of the chart is stopped simultaneously with the upward pivotal movement of the marking point.

3. In a mine hoist recorder, the combination of a supporting frame, a rotatably mounted platen in said frame, a chart on said platen, movable chart holding means adapted to rest against the platen, a screw shaft rotatably mounted in the frame, means driven by the movement of the mine hoist adapted to rotate the screw shaft, a marking device having a pivoted marking point mounted on said screw shaft adapted to move longitudinally thereof to make a mark on said chart, a lug on said pivoted marking point, an electric clock mechanism adapted to rotate the platen in synchronism with the said hoist driven screw shaft and transmit movement to the chart carried thereby, an electric switch in said clock circuit, cam means rotatably mounted in said frame, cam operating means adapted to rotate said cam means into engagement with said lug on said marking point to pivot said marking point upward from the chart, clock switch operating means connected to said cam operating means adapted to open said clock switch upon the upward pivotal movement of the marking point from the chart and releasing means adapted to move said chart holding means out of engagement with the platen and chart also connected to said cam operating means, whereby the rotation of said cam means by the cam operating means simultaneously raises the marking device from the chart, opens the clock switch and releases the chart.

HENRY H. LOGAN.